US007624927B2

(12) United States Patent
Lu et al.

(10) Patent No.: US 7,624,927 B2
(45) Date of Patent: Dec. 1, 2009

(54) CONTACTLESS CARD AND A CONTROL METHOD THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 12/020,795

(22) Filed: Jan. 28, 2008

(65) Prior Publication Data

US 2008/0283617 A1 Nov. 20, 2008

(30) Foreign Application Priority Data

May 16, 2007 (CN) .......................... 2007 1 0099282

(51) Int. Cl.
G06K 19/06 (2006.01)
G06K 7/08 (2006.01)
G06K 5/00 (2006.01)
(52) U.S. Cl. .................... 235/492; 235/380; 235/451
(58) Field of Classification Search ................ 235/380, 235/451, 492
See application file for complete search history.

(56) References Cited

U.S. PATENT DOCUMENTS

| 6,011,483 | A * | 1/2000 | Tanaka et al. ............. 340/10.33 |
| 7,438,236 | B2 * | 10/2008 | Top ............................ 235/492 |
| 2003/0149914 | A1 * | 8/2003 | Kim ............................. 714/30 |
| 2006/0266831 | A1 * | 11/2006 | Kozlay ....................... 235/451 |
| 2008/0037842 | A1 * | 2/2008 | Gutta et al. ................. 382/119 |
| 2008/0232586 | A1 * | 9/2008 | Takada et al. ............... 380/255 |

FOREIGN PATENT DOCUMENTS

| DE | 19742126 A1 | 3/1999 |
| DE | 19935528 A1 | 2/2001 |
| DE | 10140662 C1 | 3/2003 |
| EP | 1030266 A2 | 8/2000 |
| WO | WO 98/20450 A1 | 5/1998 |
| WO | WO 01/88844 A1 | 11/2001 |
| WO | WO 2005/062245 A1 | 7/2005 |

* cited by examiner

Primary Examiner—Thien M. Le
Assistant Examiner—April A Taylor
(74) Attorney, Agent, or Firm—Hammer & Associates, P.C.

(57) ABSTRACT

The present invention relates to a contactless card in smart card field and a control method thereof. The contactless card comprises a card chip, an antenna resonant circuit, and a confirmation unit. The confirmation unit, being separated from the antenna resonant circuit and connected to the I/O interface of the card chip, is used for confirming a card operation command by a cardholder so as to send a confirmation message to the card chip. The control method can be realized according to the following steps: putting a contactless card into a valid range for its reader; determining by the contactless card whether a command transmitted from the reader needs to be confirmed by the cardholder, if not, responding to the command by the contactless card, otherwise waiting for confirmation message by the contactless card; and receiving the confirmation message from the cardholder and responding to the command by the contactless card. The present method provides the cardholder with the light on the control of command execution and prevents the information stored in the card from being stolen or mis-operation to the card, which improves the usability of the contactless card and eliminates the impedance and enhances the continuity of the antenna resonant circuit and brings the convenience to the cardholder.

9 Claims, 3 Drawing Sheets

CONTACTLESS CARD AND A CONTROL METHOD THEREOF

FIELD OF THE INVENTION

The present invention relates to the contactless card field, and more particularly, to a contactless card with a confirmation unit and a control method thereof.

BACKGROUND OF THE INVENTION

The contactless card or non-contact card, as RF (Radio Frequency) card, which integrates the RF (Radio Frequency) identification technology successfully, has solved the problems of no supply power inside the card and non-contact feature. It is a big breakthrough in the electronic parts and components field.

In addition to the features of the contact card, the contactless card has the following features that 1) it is of convenient operation, in which the communication between the contactless card and its reader is wireless, so the user does not need to insert or pull the card, or fix the direction of the card, and all the user needs to do is just swaying the card within the reading area in front of the card reader (generally the valid range is within 5 to 10 cm), while the information stored in the card will be put into the card reader or the corresponding operation command will be executed inside the card, which improves the speed of the operation and is suitable for the place where many cards must be read in a short time;

2) it is of anti-interference performance, in which the conflict prevention mechanism of the contactless card can prevent the data from interference among the cards when they are put within the reading area at the same time, which permits more than one card to operate at the same time;

3) it is of high reliability, in which the contactless card and its reader do not contact each other mechanically, which avoids the troubles caused by mechanical contact, and it is no need to worry about invalidation of the card caused by the broken touch-point as well, so that the reliability of the usability is improved and the life of the card and device is extended;

4) it is of high security, in which the chip of contactless card is a security chip, the operation of the card is protected by a password and the data in the communication process is encrypted, so that all of those guarantee the security of the card; and 5) it is of multiple applications, in which the structure of the contactless card provides one card with multiple functions, so that one card can be used in different systems and places, for example, paying by card for bus transportation fee or other bills, checking the working attendance, or access controlling system, etc.

The advantages above bring many conveniences to the user. With the extension of the application field, the contactless card is more used for payment. And the advantages such as high security of the card are doubted as well. The sequence number of the contactless card is unique and can not be modified; when the contactless card is used, there are three times mutual certification between the contactless card and the card reader and the data in the communication process between them are encrypted; every sector has its own password and access condition. But since the contactless card has such an feature that the information stored on the card can be accessed by the reader by simply placing the card in front of the reader (approximately within a valid range of 5 to 10 cm from the reader), it is possible that the sensitive information of cardholder stored thereon is maliciously utilized by other people with an appropriate reader. As a result, the legitimate cardholder may suffer the loss.

Some contactless cards just execute the corresponding commands internally and do not output the information of the cards when they communicate with the card reader. In this case, if the appropriate card reader is put closer to the contactless card secretly, the contactless card will execute the corresponding command, which will bring the trouble and loss to the cardholder.

The prior solution for overcoming the disadvantages above is that a switch circuit is set on the lead connected the card chip to the antenna coil, by which the cardholder controls the right for outputting the information stored in the card or executing of the corresponding command inside the card. So the privacy of the information stored in the card is protected, the information stored in the card is prevented from being stolen, and the mis-operation to the card is avoided.

But the prior solution is not perfect, and the disadvantages are that when the switch circuit is closed, the continuity of the antenna resonant loop is not good because of the impedance, which is inconvenient for cardholder to operate, and meanwhile, any information output from the contactless card or command executed inside the card is controlled by the cardholder, so that the usability of the contactless card is weakened.

SUMMARY OF THE INVENTION

In the prior art, the switch circuit is set on the lead connected a card chip to an antenna coil, which causes the bad continuity of an antenna resonant loop and a low usability. In order to solve the disadvantages above, the present invention provides a contactless card with a confirmation unit and a control method thereof.

The present invention provides a contactless card comprising a card chip and an antenna resonant circuit, said contactless card further comprises a confirmation unit, being separated from the antenna resonant circuit and connected with the I/O interface of the card chip, for confirming a card operation command by a cardholder to send a confirmation message to the card chip.

Said chip responds to the operation command after receiving the confirmation message transmitted from the confirmation unit.

Said confirmation unit is a mechanical switch, a sensitization device, a sonic switch, a body temperature sensor, a pressure sensor, a vibration transducer, an acceleration transducer, a magnetic field sensor, or an electric field sensor.

A control method for a contactless card comprises the steps of:

1) putting the contactless card within a valid range of a card reader;

2) determining by the contactless card whether a cardholder confirmation needed to the operation related to a command transmitted from the card reader; if not, responding to the command by the contactless card, otherwise waiting for the cardholder confirmation; and 3) receiving the cardholder confirmation and responding to the command by the contactless card.

Said command not required a cardholder confirmation is customizable by the cardholder.

Said responding to the command by the contactless card further includes corresponding information output from the contactless card to the card reader.

Said responding to the command by the contactless card further includes internal operations inside the contactless card based on the command and without internal data output from the contactless card.

Said responding to the command by the contactless card further includes that digital signature data is created inside the contactless card and transmitted to the card reader.

Said confirmation message is input via the confirmation unit by the cardholder.

Said confirmation unit is a mechanical switch, a sensitization device, a sonic switch, a body temperature sensor, a pressure sensor, a vibration transducer, an acceleration transducer, a magnetic field sensor, or an electric field sensor.

The benefits of the present invention are as follows in which the confirmation unit, which is connected to the card chip I/O interface is adapted to permit the cardholder to confirm the operation command and send the confirmation message to the card chip, so the cardholder can control the card to execute the command, thus effectively preventing the information stored in the card from being stolen or the misoperation to the card and improving the usability of the contactless card. Meanwhile, the antenna resonant circuit is stable all the time, which eliminates the impedance and enhances the continuity of the antenna resonant loop. All those provide the operation convenience for the cardholder.

DETAILED DESCRIPTION OF THE PREFERRED EMBODIMENTS

Figure 1:
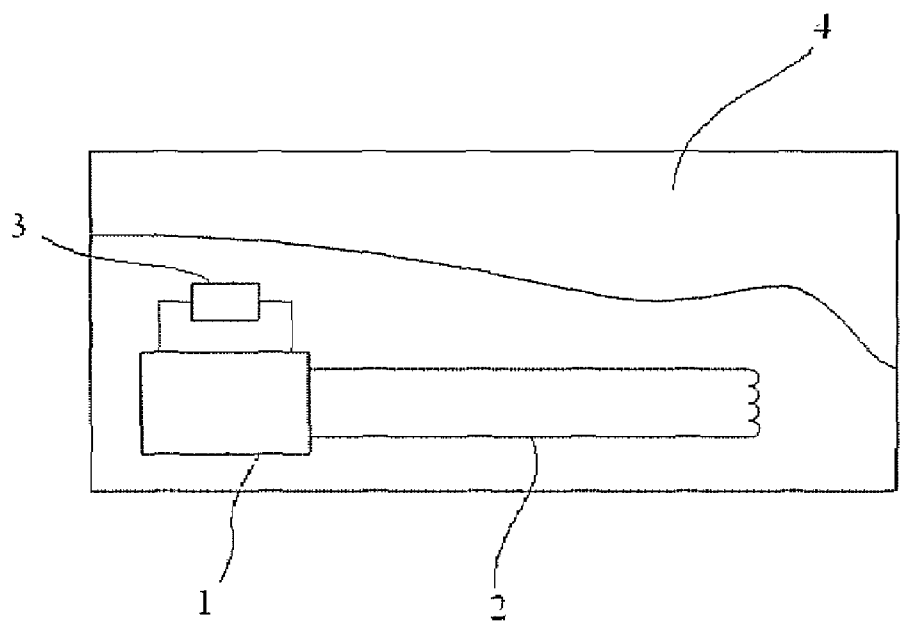
FIG. 1 shows the schematic view of a contactless card according to the present invention.

The present invention is further described with the embodiments and the drawing below, but not limited to the present invention.

The present invention will be illustrated with a preferred embodiment of a contactless card.

FIG. 1 shows the schematic view of a contactless card according to the present invention. Referring to FIG. 1, the contactless card comprises a card chip 1 and an antenna resonant circuit 2, a confirmation unit 3. The confirmation unit 3, which is separated from the antenna resonant circuit and connected to the I/O interface of the card chip 1, is used for confirming a card operation command by a cardholder to send a confirmation message to the card chip.

The confirmation unit 3 is a mechanical switch, a sensitization device, a sonic switch, a body temperature sensor, a pressure sensor, a vibration transducer, an acceleration transducer, a magnetic field sensor, or an electric field sensor etc.

In the present invention, the confirmation unit 3, which is connected to the I/O interface of the card chip 1, is used for confirming a card operation command by a cardholder to send a confirmation message to the card chip 1. So the cardholder can control the execution of operation command of the chip. That is to say, the cardholder confirms the execution command via confirmation unit 3. When the confirmation unit 3 sends the confirmation message to the card chip 1, the contactless card 4 will execute the command; when the confirmation unit 3 does not send the confirmation message to the card chip 1, the contactless card 4 will not execute the operation command.

The cardholder can customize that the operation command need not be confirmed by the cardholder. Here, the cardholder can control the operation of the card, which needs the cardholder to confirm the operation of the card. That is to say, when the confirmation unit 3 sends the confirmation message to the card chip 1, the contactless card 4 will execute the operation command; when the confirmation unit 3 does not send the confirmation message to the card chip 1, the contactless card 4 will not execute the operation command.

The antenna resonant circuit 2 is stable all the time, which eliminates the impedance and enhances the continuity of the antenna resonant loop. All those provide the operation convenience for the cardholder.

The present invention provides another preferred embodiment of the contactless card.

Figure 2:
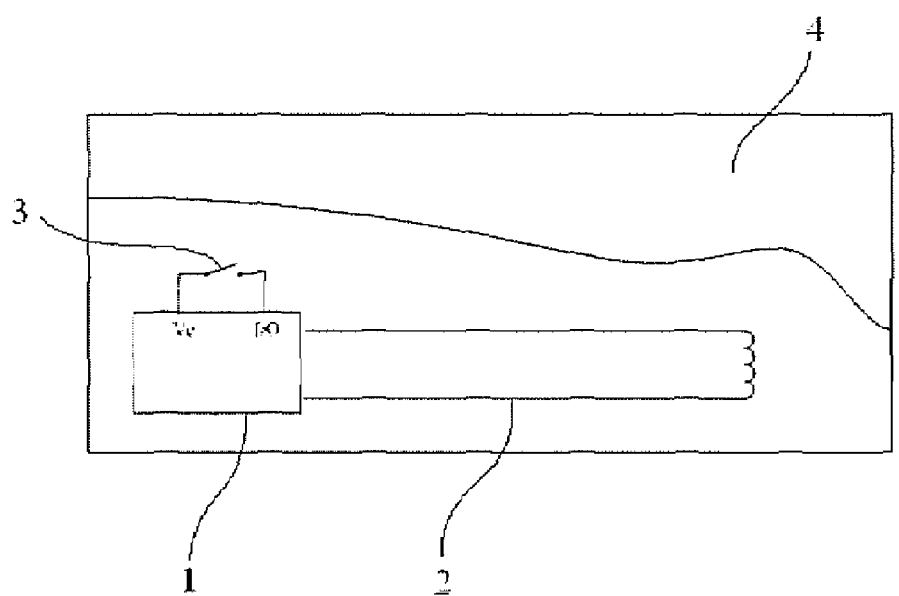
FIG. 2 shows a preferred embodiment of a contactless card according to the present invention.

FIG. 2 shows a preferred embodiment of a contactless card provided by the present invention, in which the confirmation unit is a mechanical switch.

Referring to FIG. 2, the contactless card 4 comprises a card chip 1, an antenna resonant circuit 2, and a confirmation unit 3. The confirmation unit 3, which is separated from the antenna resonant circuit and connected to the I/O interface of the card chip 1, is used for confirming a card operation command by a cardholder to send a confirmation message to the card chip.

The confirmation unit 3 can be a sensitization device, a sonic switch, a body temperature sensor, a pressure sensor, a vibration transducer, an acceleration transducer, a magnetic field sensor, or an electric field sensor, etc.

Figure 3:
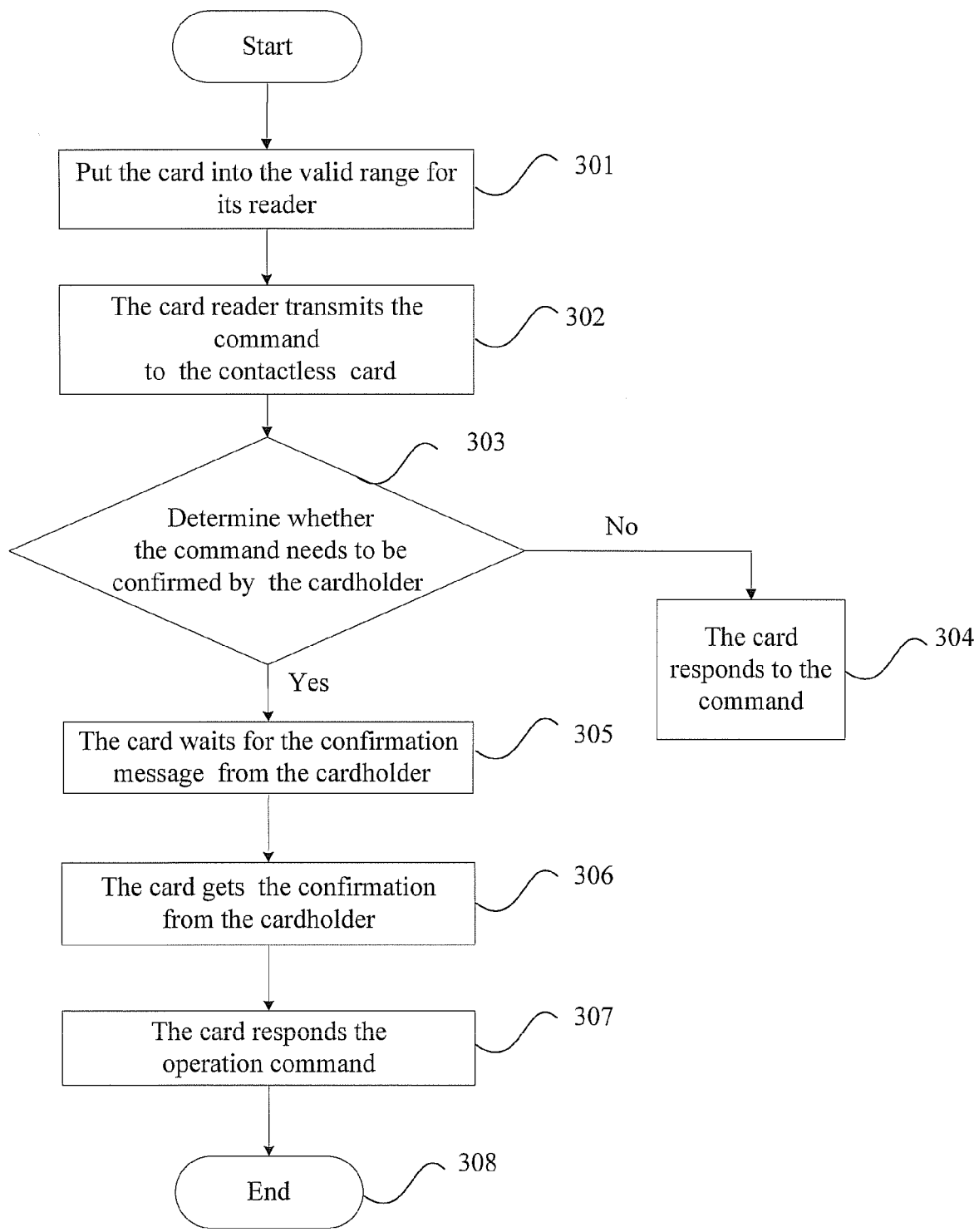
FIG. 3 shows the process of carrying out the method for controlling a contactless card according to the present invention.

FIG. 3 shows a process of carrying out a method for controlling a contactless card according to the present invention. Referring to FIG. 3, the steps of the method are as follows:

step 301: the cardholder puts the contactless card into a valid range for its reader, general valid range of which is 5-10 cm;

step 302: the reader of the contactless card transmits the operation command to the contactless card;

step 303: determining by the contactless card whether the operation command transmits from the reader needs to be confirmed by the cardholder, if no, go to step 304, otherwise, go to step 305;

step 304: the contactless card responds to the operation command;

step 305: the contactless card waits for the confirmation message from the cardholder;

step 306: the contactless card receives the confirmation message from the cardholder;

step 307: the contactless card responds to the operation command; and step 308: communication completes.

The present invention discloses a preferred embodiment of a method for controlling a contactless card.

Figure 4:
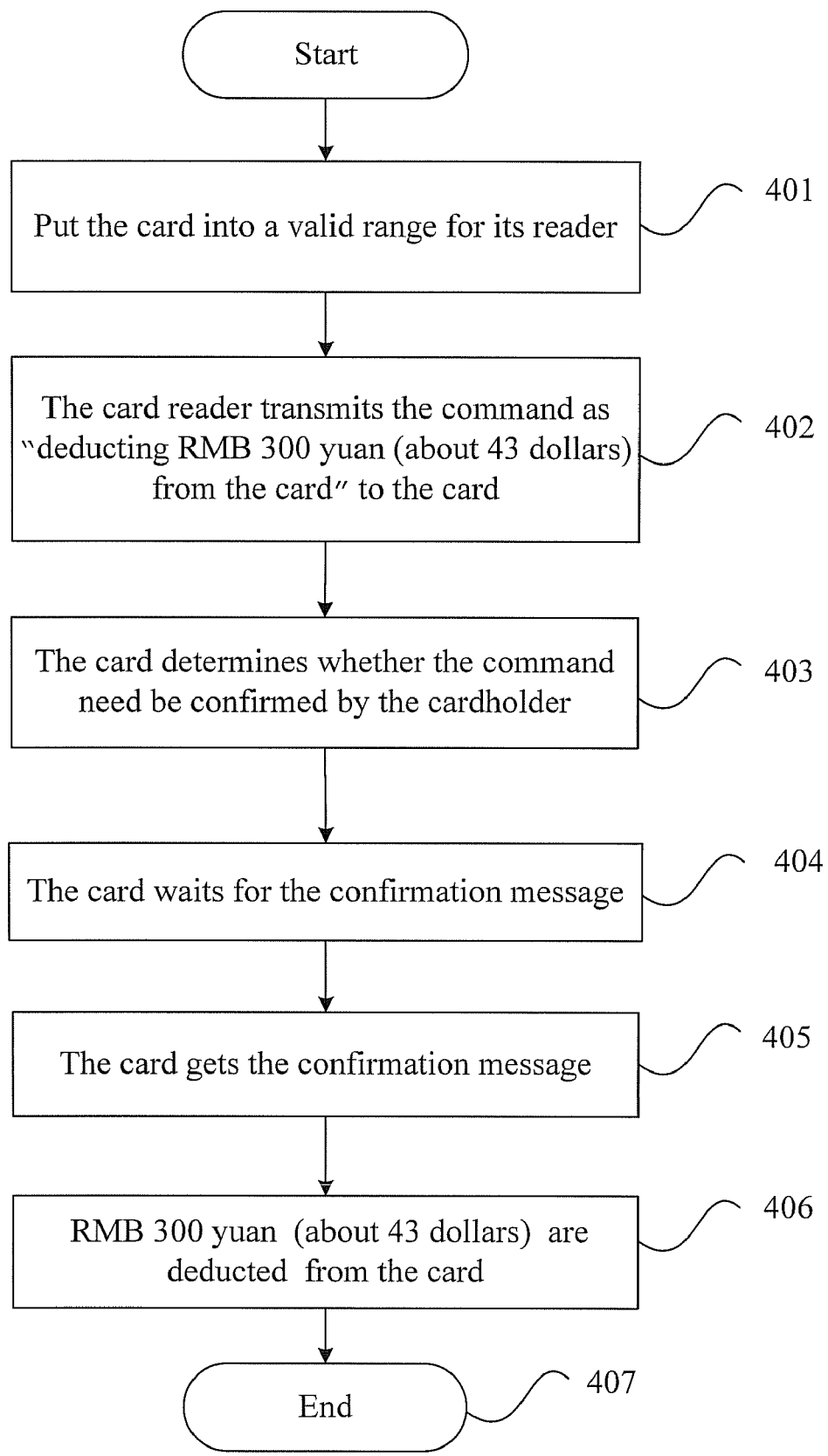
FIG. 4 shows the process of carrying out the preferred method for controlling a contactless card according to the present invention.

FIG. 4 shows a process of carrying out the preferred method for controlling a contactless card of the present invention. In the present embodiment, the cardholder customizes that the operation command does not need to be confirmed by the cardholder. The customization is that the confirmation message from the cardholder is not needed when the deducted sum is equal to or less than RMB 200 yuan (about 28 dollars). If the execution command is that the deducted sum is more than RMB 200 yuan (about 28 dollars), the cardholder has to confirm the sum via the mechanical switch. Then contactless card will execute the operation command internally to deduct the corresponding sum.

Referring to FIG. 4, the process of the present embodiment includes the following steps:

step 401: the cardholder puts the contactless card into the valid range of its reader;

step 402: the reader of the contactless card transmits the operation command as "deducting RMB 300 yuan (about 43 dollars) from the card" to the contactless card;

step 403: the contactless card finds that the sum in the operation command is more than RMB 200 yuan (about 28 dollars) and the operation command needs to be confirmed by the cardholder;

step 404: the contactless card waits for the confirmation message for the command as "deducting RMB 300 yuan (about 43 dollars) from the card";

step 405: the contactless card gets the confirmation message from the cardholder via the mechanical switch;

step 406: RMB 300 yuan (about 43 dollars) is deducted from the card; and step 407: communication completes.

The mechanical switch in the present embodiment can be replaced with a sensitization device, a sonic switch, a body temperature sensor, a pressure sensor, a vibration transducer, an acceleration transducer, a magnetic field sensor, or an electric field sensor, etc.

The operation command described above may include a digital signature command, by which the cardholder can control the responding to the command via the confirmation unit. The detailed steps of the method are basically same as the steps of the present embodiment above, so we will not go further on this point.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A contactless card comprising a card chip and an antenna resonant circuit, said contactless card further comprises a confirmation unit which is provided to be separated from the antenna resonant circuit and connected to the I/O interface of the card chip, for confirming a card operation command by a cardholder so as to send a confirmation message to the card chip, characterized in that said contactless card further comprises a means of determining whether a cardholder needs to confirm a command transmitted from the card reader, if not, responding to the command by the contactless card, otherwise waiting for the cardholder confirmation, and once receiving the cardholder confirmation, responding to the command by the contactless card, characterized in that said command not requiring a cardholder confirmation is customizable by the cardholder.

2. A contactless card according to claim 1, wherein said antenna resonant circuit is stable and of continuity.

3. A contactless card according to claim 1, wherein said confirmation unit is a mechanical switch, a sensitization device, a sonic switch, a body temperature sensor, a pressure sensor, a vibration transducer, an acceleration transducer, a magnetic field sensor, or an electric field sensor.

4. A method for controlling a contactless card which comprises a card chip and an antenna resonant circuit, further comprising a confirmation unit which is provided to be separated from the antenna resonant circuit and connected to the I/O interface of the card chip, for confirming a card operation command by a cardholder so as to send a confirmation message to the card chip, said method comprises a step of putting the contactless card within a valid range of a card reader; characterized in that said method further comprises a step of determining by the contactless card whether a cardholder confirmation is needed to an operation related to a command transmitted from the card reader, if not, responding to the command by the contactless card, otherwise waiting for the cardholder confirmation, and once receiving the cardholder confirmation, responding to the command by the contactless card, characterized in that said command not requiring a cardholder confirmation is customizable by the cardholder.

5. A method for controlling the contactless card according to claim 4, wherein said responding to the command by the contactless card further includes corresponding information output from the contactless card to the card reader.

6. A method for controlling the contactless card according to claim 4, wherein said responding to the command by the contactless card further includes internal operations inside the contactless card based on the command and without internal data output from the contactless card.

7. A method for controlling the contactless card according to claim 4, wherein said responding to the command by the contactless card further includes that digital signature data is created inside the contactless card and transmitted to the card reader.

8. A method for controlling the contactless card according to claim 4, wherein said confirmation message is input via the confirmation unit of the contactless card by the cardholder.

9. A method for controlling the contactless card according to claim 8, wherein said confirmation unit is a mechanical switch, a sensitization device, a sonic switch, a body temperature sensor, a pressure sensor, a vibration transducer, an acceleration transducer, a magnetic field sensor, or an electric field sensor.

* * * * *